United States Patent
Agrawal et al.

(10) Patent No.: US 8,831,228 B1
(45) Date of Patent: Sep. 9, 2014

(54) SYSTEM AND METHOD FOR DECENTRALIZED MANAGEMENT OF KEYS AND POLICIES

(75) Inventors: Sunil C. Agrawal, Milpitas, CA (US); Katherine K. Nadell, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 524 days.

(21) Appl. No.: 12/550,264

(22) Filed: Aug. 28, 2009

(51) Int. Cl.
 *H04L 9/08* (2006.01)
(52) U.S. Cl.
 USPC ........... 380/286; 380/277; 380/278; 380/279; 380/281; 726/27; 726/28; 713/171
(58) Field of Classification Search
 USPC .......... 713/171, 175; 380/283, 277, 278, 279, 380/286; 726/27, 28
 See application file for complete search history.

(56) References Cited

U.S. PATENT DOCUMENTS

| | | | |
|---|---|---|---|
| 5,910,987 A | 6/1999 | Ginter | |
| 6,049,612 A * | 4/2000 | Fielder et al. | 380/44 |
| 7,237,123 B2 | 6/2007 | LeVine | |
| 7,443,985 B2 | 10/2008 | Krishnaswamy | |
| 2003/0014630 A1 | 1/2003 | Spencer | |
| 2006/0002561 A1 | 1/2006 | Choi | |
| 2006/0280303 A1 | 12/2006 | Gupte | |
| 2007/0156587 A1 | 7/2007 | Yu | |
| 2007/0206799 A1 * | 9/2007 | Wingert et al. | 380/285 |
| 2008/0020707 A1 * | 1/2008 | Takayama et al. | 455/41.2 |
| 2008/0040618 A1 | 2/2008 | Andersson | |
| 2008/0189213 A1 * | 8/2008 | Blake et al. | 705/59 |
| 2008/0310628 A1 * | 12/2008 | Fujioka et al. | 380/201 |
| 2009/0106552 A1 | 4/2009 | Mohamed | |

FOREIGN PATENT DOCUMENTS

| | | |
|---|---|---|
| WO | 03079165 | 9/2003 |
| WO | 2008139335 | 11/2008 |

* cited by examiner

*Primary Examiner* — Jung Kim
*Assistant Examiner* — Ayoub Alata
(74) *Attorney, Agent, or Firm* — Kilpatrick Townsend & Stockton LLP

(57) ABSTRACT

Various embodiments of a system and method for decentralized management of keys and policies are described. Various embodiments may include a computer system configured to receive a request from a remote computer system associated with a recipient of content. Such request may include an encrypted content encryption key that is encrypted with a packaging key utilized by a packaging entity. The request may also include an identifier identifying the packaging entity. In some embodiments, the request may also include policy information specifying one or more usage rights of the content. The computer system may be configured to, in response to determining the recipient is authorized to access the content, generate the packaging key based on the identifier and a secret root seed, utilize the generated packaging key to decrypt the encrypted content encryption key, and provide the decrypted content encryption key to the remote computer system.

42 Claims, 9 Drawing Sheets

SYSTEM AND METHOD FOR DECENTRALIZED MANAGEMENT OF KEYS AND POLICIES

BACKGROUND

1. Field of the Invention

The present invention is directed to computer systems and other electronic devices. More particularly, it is directed to key management within such an environment.

2. Description of the Related Art

In prior years it would not be uncommon for an individual to obtain content (e.g., literary works, periodicals, music, and movies) from a retail location in the form of a physical medium. For example, an individual might travel to a local bookstore and purchase written works in the form of a book, newspaper, or magazine. In another example, an individual might purchase music stored on a Compact Disc (CD) or a motion picture stored on a Digital Video Disc (DVD). In recent years the ubiquity of the Internet and the World Wide Web has paved the way for alternative methods of obtaining content. For example, a user might log on to a music retailer's website and download a digital version of a music album. In other example, a user might log on to a movie subscription provider's website to download or stream a motion picture to view on a personal computer. In the case of books, a user might log on to a bookseller's website and download an electronic book ("e-book") for view on a computer system, such as a desktop computer or a handheld e-book reader.

The Internet and World Wide Web serve as a backbone for numerous file sharing mechanisms. Examples of such mechanisms include electronic mail ("email") and more advanced file distribution software, such as peer-to-peer ("P2P") file sharing applications. In many cases, such file sharing mechanisms are often utilized to distribute electronic content to individuals that are not authorized to access such content. Such distribution is likely due in part to the relative ease and anonymity of sharing files through such mechanisms. To combat unauthorized consumption of content, some content owners have adopted an approach to protecting their content known as digital rights management ("DRM"), which may include various techniques for limiting access of electronic content to authorized entities and/or controlling the manner in which entities access electronic content.

SUMMARY

Various embodiments of a system and method for decentralized management of keys and policies are described. Various embodiments may include a computer system configured to receive a request from a remote computer system associated with a recipient of content. Such request may include an encrypted content encryption key that is encrypted with a packaging key utilized by a packaging entity. The request may also include an identifier identifying the packaging entity. The computer system may be configured to, in response to determining the recipient is authorized to access the content, generate the packaging key based on the identifier and a secret root seed, utilize the generated packaging key to decrypt the encrypted content encryption key, and provide the decrypted content encryption key to the remote computer system.

Various embodiments of the system and method for decentralized management may also include a packager system that includes a secret packaging key issued by a license server to a packaging entity. The secret packaging key may be based on a private root seed held by the license server and additionally based on an identifier identifying the packaging entity. In various embodiments, the packager system may be configured to encrypt content with a content encryption key, encrypt the content encryption key with the secret packaging key to generate an encrypted content encryption key. The packager system may also be configured to provide the encrypted content, the encrypted content encryption key, and the identifier of the packaging entity to a remote computer system.

Various embodiments of the system and method for decentralized management may also include a computer system configured to receive encrypted content, an encrypted content encryption key corresponding to that encrypted content, and an identifier of a packaging entity that created the encrypted content. The computer system may also be configured to provide a request to a remote computer system. Such request may include the encrypted content encryption key and the identifier of the packaging entity that created the encrypted content. The computer system may also be configured to, subsequent to the remote computer system decrypting the encrypted content encryption key in accordance with the identifier and a secret root seed of the remote computer system, receive that decrypted content encryption key from the remote computer system. The computer system may also be configured to utilize the decrypted content encryption key to decrypt the encrypted content.

Various embodiments of the system and method for decentralized management may also include a license server configured to receive a request from a remote computer system associated with a recipient of content. Such request may include an encrypted content encryption key encrypted with a public key of the license server. The request may also include policy information specifying one or more usage rights of the content. In various embodiments, the license server may be configured to, in response to determining the recipient is authorized to access the content, utilize a private key corresponding to the public key to decrypt the encrypted content encryption key, generate a content license for the content based on the policy information, and provide the decrypted content encryption key and the content license to the remote computer system.

Figure 2:
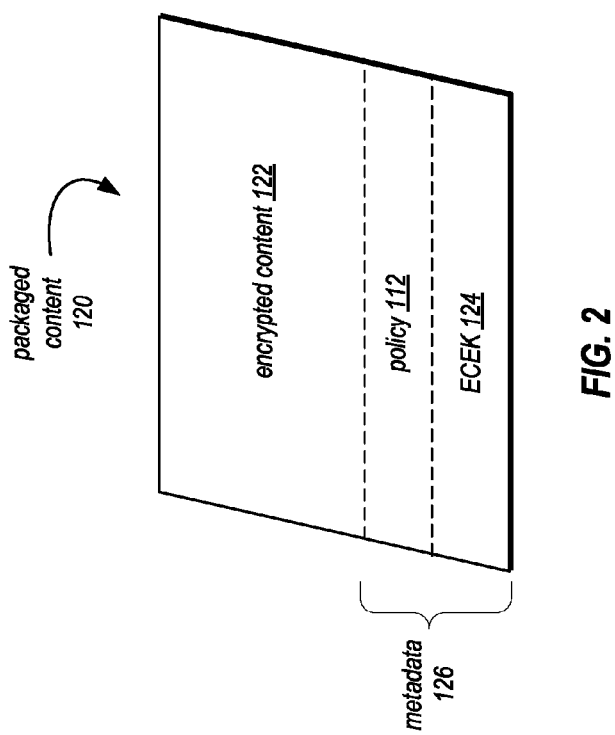
FIG. 2 illustrates an example data structure for packaged content created by a packaging entity, according to some embodiments.

While the system and method for decentralized management of keys and policies is described herein by way of example for several embodiments and illustrative drawings, those skilled in the art will recognize that the system and method for decentralized management of keys and policies is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for decentralized management of keys and policies as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Various embodiments of a system and method for decentralized management of keys and policies are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various portions of this detailed description may refer to "client(s)" and "server(s)" or similar terminology. For instance, various embodiments may include (among other elements) a client system or client device (or simply a "client") and/or one or more server systems (or simply "servers") (e.g., license servers). It should be understood that the terms "client" and "server" do not impose any limitation on the operation, configuration, or implementation of such elements. It should be understood that these terms are used only as convenient nomenclature. Indeed, various embodiments are in no way limited by the principles of a conventional client-server architecture. For instance, any of the "clients" or "servers" described herein may be configured to communicate according to a variety of communication protocols or system architectures, such as a peer-to-peer (P2P) architecture or some other architecture, whether such architecture is presently known or developed in the future.

In various instances, this detailed description may refer to content (which may also be referred to as "digital content," "content item(s)," "content data," "content information" or simply "data" or "information"). In some embodiments, content may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV or .F4V) format or some other video file format whether such format is presently known or developed in the future.

In various embodiments, content may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content may include any combination of the above-described examples.

In various embodiments, content may include electronic representations of messages or communications, including but not limited to email messages, instant messages (commonly referred to as "IMs"), text messages (e.g., SMS messages), multimedia messages (e.g., MMS messages), video mail, voice mail, and/or some other electronic representation of messages or communications (whether presently known or developed in the future). In various embodiments, the consumption of such content may include but is not limited to generating, rendering, presenting, and/or displaying such content. In one particular example, content may include an email message and an application for consuming such email message may include an email client.

In various instances, this detailed disclosure may refer to consuming content or to the consumption of content, which may include accessing content, rendering content, displaying content, playing content, and generating, storing or accessing an unencrypted version of content, among other things. In some cases, consuming content may include generating a human-perceptible version of the content (e.g., presenting or displaying video on a display, generating audio through a transducer or speaker, etc) from a stored representation of content within memory of a computer system. In some cases, the particular term utilized to convey the consumption of content may be dependent on the context in which it is used. For example, consuming video may also be referred to as viewing or playing the video. In another example, consuming audio may also be referred to as listening to or playing the audio.

Figure 13:
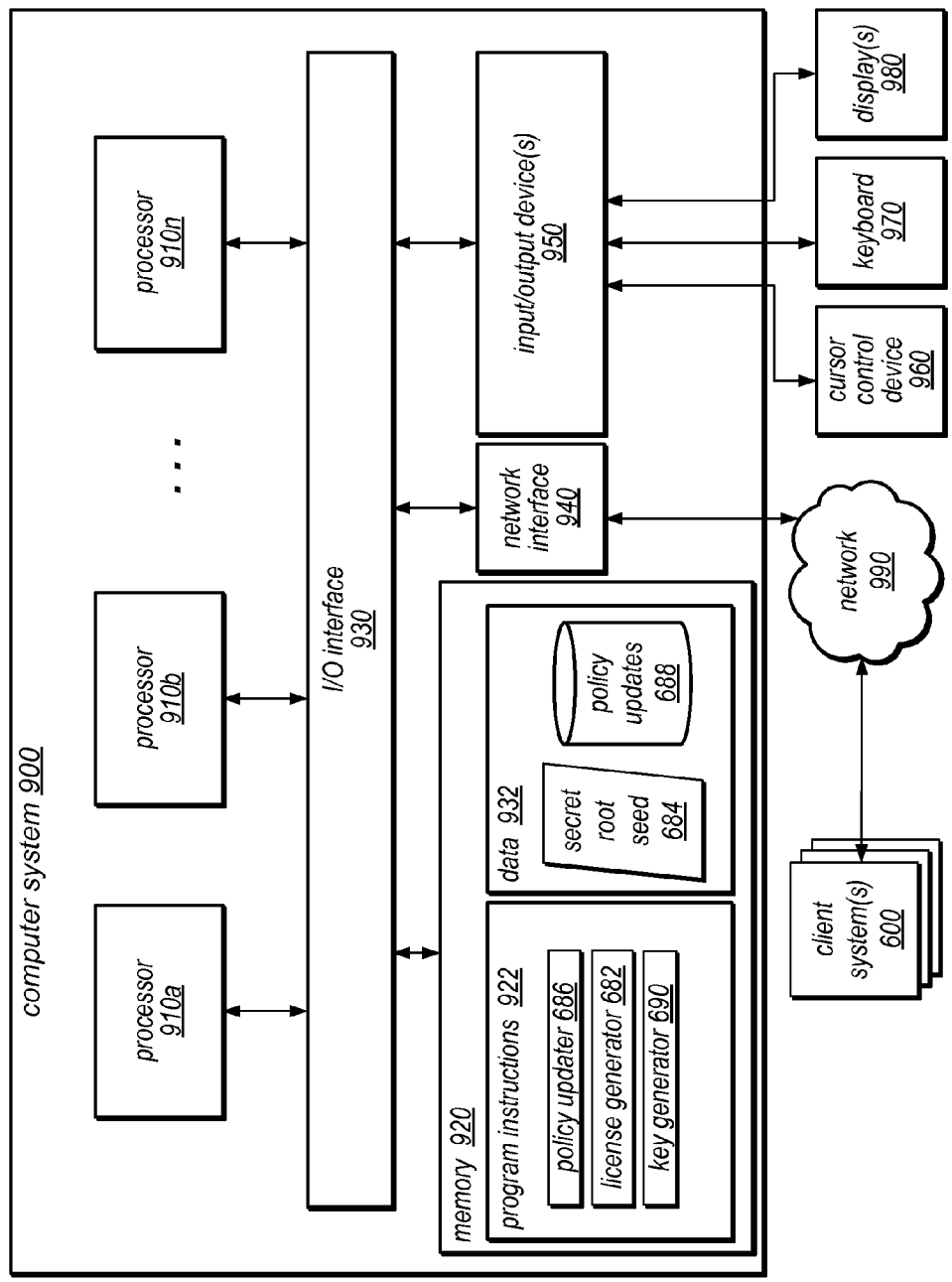
FIG. 13 illustrates an example computer system suitable for implementing various components of the system and method for decentralized management of keys and policies, according to various embodiments.

In various instances, this detailed description may refer to a device configured to perform content consumption. In various embodiments, such a device may include but is not limited to a computing system (e.g., a desktop or laptop computer), a digital audio or multimedia player (e.g., an MP3 player), a personal digital assistant (PDA), a mobile phone, a smartphone, an e-book reader, a digital photo frame, a netbook, camera, a set top box, a video game console, or any other electronic device or system configured to access, view, read, write, and/or manipulate any of the content data described herein. The computer system of FIG. 13 (described below) may be utilized to implement any of the aforesaid systems or devices in various embodiments.

Note that in various instances the description presented herein may refer to a given entity (e.g., a packaging entity, a content recipient, a license server, etc.) performing some action. It should be understood that this language may in some cases mean that a system (e.g., a computer system) owned and/or controlled by the given entity is actually performing the action.

Note that the description presented herein may include one or more references to a one-way function or a cryptographic hash function, either of which may be referred to herein as simply a hash function. Generally speaking, a hash function may operate on a block of data in order to return a fixed-size bit string (e.g., the hash value, or simply "hash") such that an accidental or intentional change to the block of data will result in a different hash value if the hash function is performed on that changed data (although variations thereof may be utilized in various embodiments). In some cases, the aforesaid block of data may be referred to as a "message" and the corresponding hash value may be referred to as the "message digest." In various embodiments, a hash function may include any function or set of operations operating as described above. Examples of hash functions include, but are not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of any of the aforesaid hash functions. In various embodiments, references to performing cryptographic hash functions may include generating a keyed-Hash Message Authentication Code (HMAC), such as HMAC-SHA1 or HMAC-MD5. In various embodiments, the key generator described herein may be configured to utilize one or more cryptographic hash functions to generate packaging keys.

Various embodiments may include various encryption and/or decryption keys, any of which may be generated via a key derivation function (KDF). Some key derivation functions may include one or more iterations or instances of hash functions and/or other cryptographic operations in order to generate an encryption or decryption key. Examples of key derivation functions may include but are not limited to any key derivation functions specified by Public Key Cryptography Standards (PKCS) (e.g., PKCS-5) or Adobe® Password Security. In various embodiments, KDFs may be utilized by any of the various components described herein to generate encryption keys for symmetric encryption.

Note that in various instances the description presented herein may refer to a public key being associated with a private key or a public key corresponding to private key. It should be understood that such statements may mean that such a public key forms a public key-private key pair with such a private key. Additionally, in some cases, a public key-private key pair may be referred to as simply a "key pair." Note that in various embodiments, public key-private key pairs may be generated via one or more iterations of cryptographic hash functions and/or one or more iterations of key generation functions. For symmetric encryption, references to a decryption key corresponding to an encryption key may mean that the decryption key is the same as the encryption key. For asymmetric encryption, references to a decryption key corresponding to an encryption key may mean that the decryption key is a private key and the encryption key is the public key that forms a public key-private key pair with the decryption key. References to encryption may include asymmetric encryption, symmetric encryption, another type of encryption, or some combination thereof.

In various instances, the description presented herein may describe operations or functionality as being performed on a "license server." Note that this phrase is merely convenient nomenclature utilized for clarity of the description. Any system described as a license server herein may but need not actually provide licenses for content in all embodiments. For example, in some embodiments, such systems may be configured as key management servers that manage the provisioning of cryptographic keys (e.g., symmetric keys) as described in more detail herein. In general, the phrase "license server" may be used as a non-limiting term that may include any type of computer system or electronic device that performs the functionalities described herein.

INTRODUCTION

In conventional DRM systems, a computer system operated by a content consumer may request a license for protected content from a license server. Upon receiving a request for a content license, conventional license servers typically retrieve a content encryption key ("CEK") for the protected from a centralized key store, which may include CEKs used at packaging time to encrypt the content. Conventional license servers may also retrieve policy information associated with the protected content from a centralized policy store, which may include policy information for different content. The license servers may use the policy information to generate a license for the content and send the content license as well as the retrieved CEK to the requesting computer system. The reliance on centralized key and policy stores may introduce difficulty into the process of distributing license servers across a large geographic area (e.g., due to network latency when retrieving keys/policies), create a single point of failure (e.g., the centralized key or policy store), and reduce the performance of the overall system when dealing with large quantities of requests.

Additionally, conventional DRM systems typically rely on some sort of communication between the packaging system and the aforesaid key store at packaging time. For instance, conventional systems may require that packaging systems communicate with a server that operates the key store in order to establish the CEK that will be used to protect the content being packaged. The key store may be populated with multiple CEKs established in this manner. However, such conventional systems may not meet the needs of entities (e.g., content owners) that desire to keep clear content (as well as the systems packaging such content) isolated from other machines. By relying on a connection between the packaging system and the key store at packaging time, conventional systems may leave packaging systems vulnerable to security attacks or exploits that leverage such connection for malicious purposes (e.g., the theft of high-value content).

Various embodiments described herein provide packaging, consumption, and license/key provisioning techniques that may not rely on centralized key or policy stores. As described in more detail below, various embodiments may utilize public key encryption (e.g., asymmetric encryption) for protecting CEKs. Examples of the public key approach are described below with respect to FIGS. 1-5. Additionally, other embodiments may utilize symmetric key encryption for protecting CEKs. Examples of the symmetric key approach are described below with respect to FIGS. 6-13. In various embodiments, by utilizing such techniques for protecting CEKs, the CEKs may be passed along within content and eventually within license/key requests sent to a license server such that the license server does not have to retrieve the CEK elsewhere (e.g., from a centralized key store). Similar techniques may be used for policy information. For instance, policy information may be passed along within content and eventually within license/key requests sent to a license server such that the license server does not have to retrieve the policy information elsewhere. (Although some embodiments described herein do provide techniques for updating policy information if necessary.)

Public Key Approach to Protecting the CEK

Figure 1:
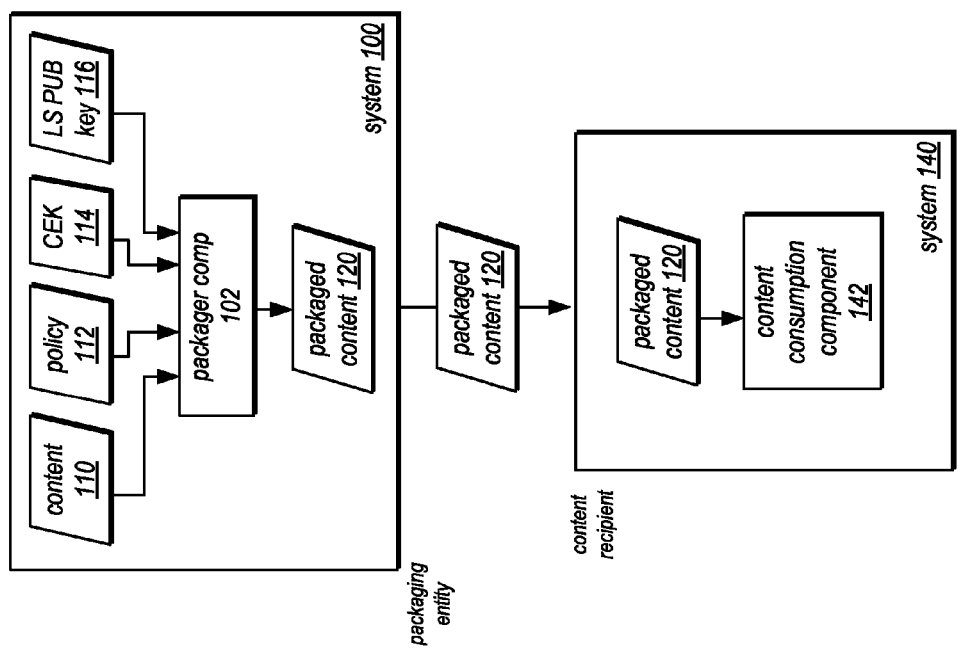
FIG. 1 illustrates a block diagram of a packaging entity creating and distributing packaged content to a content recipient, according to some embodiments.

FIG. 1 illustrates the packaging of content by a packaging entity and the distribution of such content to a content recipient, according to various embodiments. In various embodiments, system 100 may be a computer system (or other electronic device) and the illustrated elements may be stored in memory of such computer system. In various embodiments, system 100 may include a packager 102 configured to package content, such as content 110. Content 110 may include any of the content described above, including but not limited to email message(s), video content, and/or audio content. System 100 may also include a policy 112, which may be generated by the packager component or retrieved elsewhere (e.g., a local data store of policies for content). Policy 112 may specify one or more usage rights (or usage rules) for the content. In general, usage rights may include any restrictions on the use or access of the content including but not limited to restricting the access of content to one or more authorized users or machines, restricting use of the content to a particular time period, and restricting the actions (e.g., view, copy, save, distribute, etc.) that can be performed with respect to the content. In one example, the content may be an email message and the policy may specify a list of authorized recipients for that email message. In various embodiments, at least some of the policy information of the policy may be specified by the packaging entity (e.g., a content owner or publisher). System 100 may also include a content encryption key 114 (CEK 114), which may in some cases be generated by packager 112. CEK 114 may have different lengths in various embodiments. In one example, CEK 114 may be a 128 bit Advanced Encryption Standard (AES) key. System 100 may also include a license server public key 116 (LS PUB key 116). License server public key 116 may be the public key of a license server that may be queried by content recipients as described in more detail below with respect to FIG. 3.

In various embodiments, license server public key 116 may be acquired by system 100 some time prior to when content 110 is packaged. In some cases, such acquisition may occur "out-of-band" using secure communication channels or similar techniques. In one example, system 100 may acquire license server public key 116 over a secure communication channel via a data network; subsequent to that acquisition, system 100 may be removed from the data network in order to isolate system 100 from other systems (e.g., by physically disconnecting the network connection between system 100 and the data network). In another example of an out-of-band key acquisition, an administrator may store license server public key 116 on a physical storage medium (e.g., optical or magnetic media, such as a diskette or compact disc) and perform a secure load of license server public key 116 onto system 100. Also note that the license server public key 116 may be utilized to package multiple portions of content over time. According to the above-described techniques, license server public key 116 may be acquired once (e.g., in a secure, possibly out-of-band manner) such that it does not have to be acquired at content packaging time. In this way, clear content, such as content 110, can be isolated from other systems at packaging time.

Packager component 102 may be configured to package the content by generating packaged content 120, an example of which is illustrated in FIG. 2. FIGS. 1 and 2 are described collectively herein. As illustrated, packaged content 120 may include encrypted content 122 and metadata 126. In various embodiments, packager 102 may be configured to generate encrypted content 122 by utilizing a symmetric encryption process (or function) to encrypt content 110 with CEK 114; encrypted content 122 may be the result of such symmetric encryption. In one particular non-limiting example, such symmetric encryption process may include using the Advanced Encryption Standard Cipher Algorithm in Cipher Block Chaining Mode ("AES-CBC").

Metadata 126 may include policy 112 as well as an encrypted version of CEK 114, which is illustrated as ECEK 124. In various embodiments, packager 102 may be configured to generate ECEK 124 by encrypting CEK 114 with the license server public key 116. In this way, only entities that have access to the private key corresponding to license server public key 116 will be able to decrypt ECEK 124 to determine CEK 114. In some embodiments, the private key corresponding to license server public key 116 may only be accessible to one or more authorized license servers (e.g., the license server of FIG. 3). In this way, only entities that have access to the private key corresponding to license server public key 116, such as the license server of FIG. 3, will be able to decrypt the content. In various embodiments, metadata may include other information, such as the network location of one or more license servers from which license(s) are to be requested. In various embodiments, one or more portions of metadata 126 and/or all of packaged content 120 may be digitally signed by the packaging entity such that other entities (e.g., the content recipient or license server) can verify the digital signature in order to verify the authenticity of such data (e.g., determine that such data was provided by the packaging entity and/or determine that such data has not been altered).

In various embodiments, packaged content 120 may be provided by system 100 (e.g., the packaging entity) to system 140 (e.g., the content recipient). In embodiments where system 100 is an isolated system, packaged content 120 may be securely removed from system 100, passed to one or more intermediary systems, and such intermediary systems may provide the packaged content to system 140. For instance, according to such techniques, packaged content 120 may be securely removed from system 100 (such that system 100 remains isolated) and passed to a content distribution network (CDN) accessible to system 140 over a network, such as the Internet. System 140 may retrieve packaged content 120 from the CDN. In embodiments where isolation of system 100 is not a concern, system 100 may send the packaged content 120 to system 140, either directly (e.g., point-to-point communication) or through one or more intermediary systems. For example, such intermediary systems might include CDNs or email servers.

Content consumption component 142 may include any element configured to decrypt packaged content given a corresponding content license. Examples of content consumption components include but are not limited to multimedia players and email clients. In one non-limiting example, content consumption component 142 may include Adobe® Flash® Player or Adobe® AIR™. In various embodiments, content consumption component 142 may include a DRM component for performing cryptographic operations, such as encryption or decryption. In one non-limiting example, such a DRM component may include Adobe® DRM Client for Flash® Player. Content consumption component 142 may be configured to acquire a CEK and content license for the packaged content and consume (e.g., present, play, display, render, etc.) the content on system 140, as described in more detail below with respect to FIG. 3.

Figure 3:
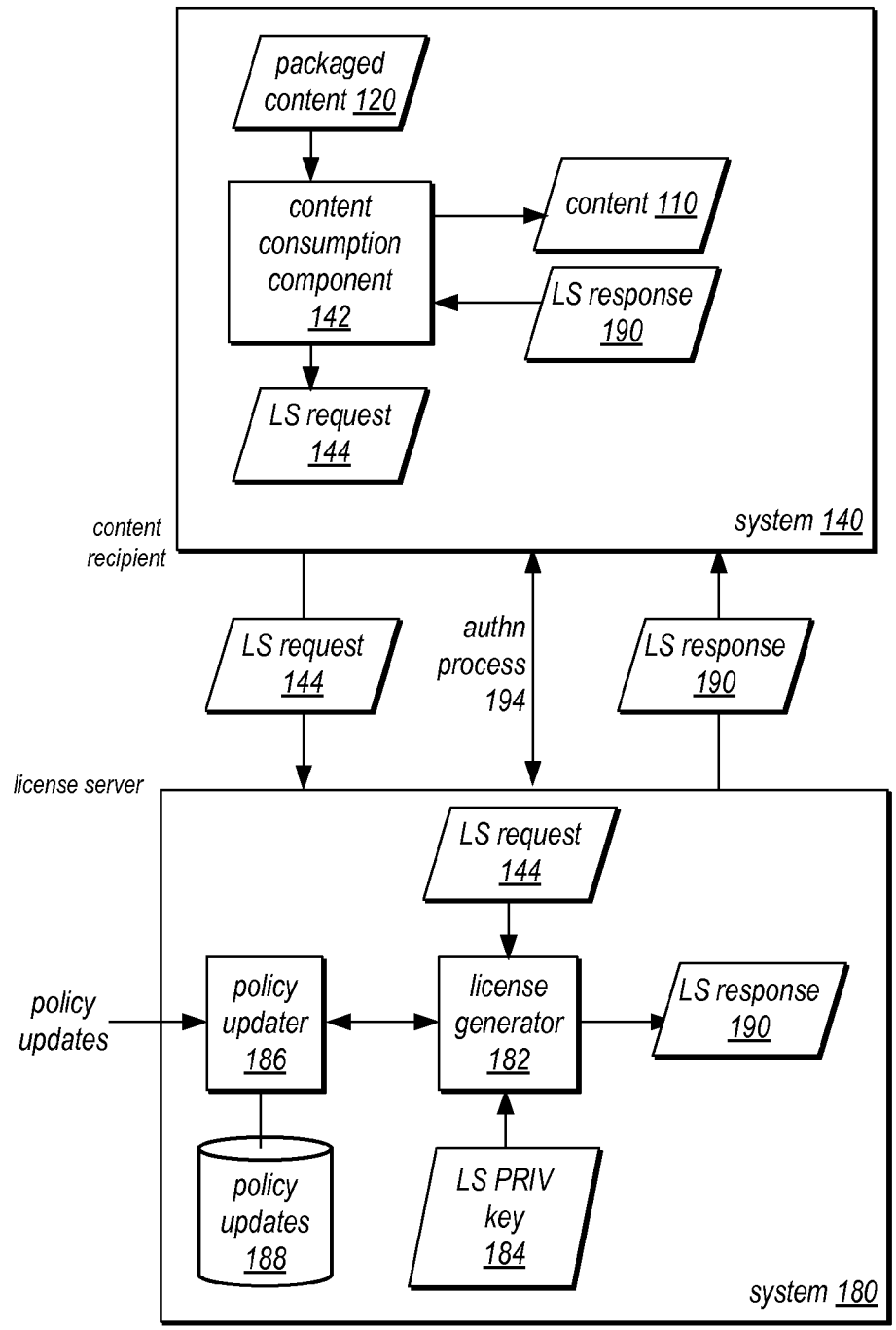
FIG. 3 illustrates a block diagram of a recipient entity requesting and receiving a content license and content encryption key from a license server, according to some embodiments.
Figure 4:
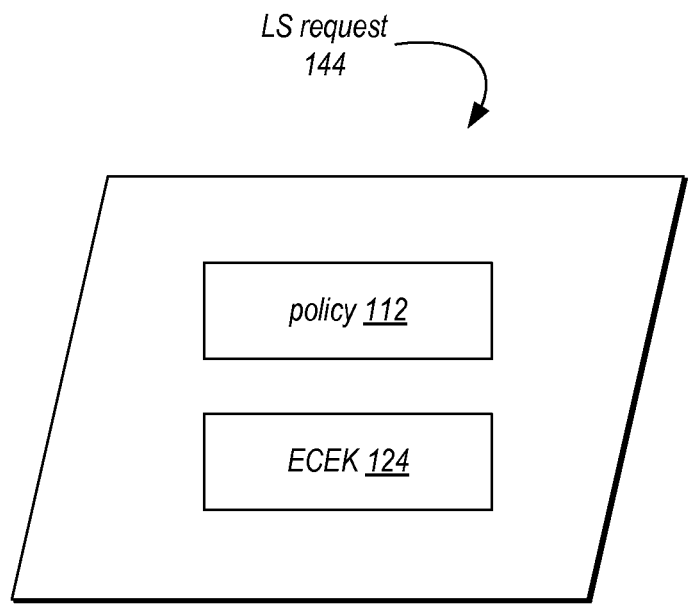
FIG. 4 illustrates an example data structure for a request submitted to a license server, according to some embodiments.

FIG. 3 illustrates a key and license acquisition process between the content recipient system and the license server system, according to some embodiments. Based on packaged content 120, content consumption component may be configured to generate a request for the license server; such a request is illustrated as LS request 144. One example of such a request is illustrated in FIG. 4, which is described collectively with FIG. 3. As illustrated in FIG. 4, request 144 generated by the content consumption component may include policy 112, which may be sourced from packaged content 120 by the content consumption component. Request 144 may also include ECEK 144, which may also be sourced from packaged content 120 by the content consumption component. The content consumption component may send such information as a request to the license server system 180 in order to request a content license and the CEK for packaged content 120.

License generator 182 of system 180 may be configured to process request 144, as described in more detail below. In various embodiments, license generator 182 may be configured to perform an authentication process 194 with the content recipient's system 140 in order to establish the content recipient's identity. In various embodiments, the content recipient may be identified by a machine/system identifier, an application identifier (e.g., an identifier identifying content consumption component 142), or a user identifier (e.g., an identifier identifying a user of system 140). Based on the content recipient's identity, license generator 182 may be configured to determine whether the content recipient is authorized to access the content. As described above, policy 112 of request 144 may in some embodiments indicate one or more authorized users that are authorized to access the content. License generator 182 may be configured to determine whether policy 112 indicates that the content recipient is authorized to access the content. If the content recipient is not authorized to access the content, license generator 182 may be configured to prevent the content recipient from receiving a content license and/or CEK for packaged content 120. If the content recipient is authorized to access the content, the license generator may be configured to generate a response to be sent to system 140, such response illustrated as LS response 190.

Figure 5:
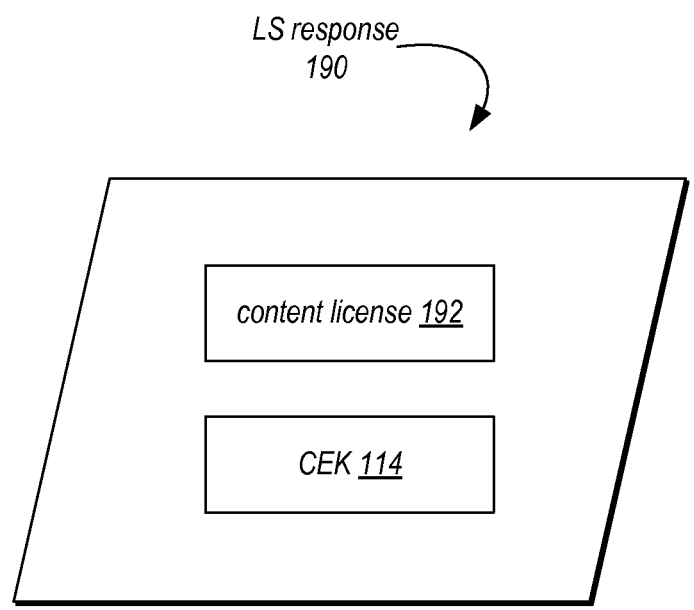
FIG. 5 illustrates an example data structure of a license server's response to a license/key request, according to some embodiments.

FIG. 5 illustrates one example of LS response 190 according to some embodiments; FIG. 5 is described collectively with previous Figures. As illustrated, the license generator may generate a content license 192 and include such license in the response to the content recipient. Content license 192 may be generated based on policy 112. As described above, policy 112 may be digitally signed (by the packaging entity); license generator may be configured to verify the digital signature before using policy 112 for content license generation (e.g., to ensure that the policy has not been tampered with). In various embodiments, content license 192 may be generated such that the content license indicates usage rights extracted from the policy. As described above, usage rights may include any restrictions on the use or access of the content including but not limited to restricting the access of content to one or more authorized users or machines, restricting use of the content to a particular time period, and restricting the actions (e.g., view, copy, save, distribute, etc.) that can be performed with respect to the content. In some embodiments, the usage rights may be changed or updated based on one or more policy updates as described in more detail below.

In addition to content license 192, license generator 182 may also include a copy of CEK 114 in the response to the content recipient. In various embodiments, license generator 182 may generate CEK 114 as follows. As described above, LS request 144 may include ECEK 124, which may be an encrypted version of CEK 114 encrypted with the license server's public key. License generator 182 may have access to the private key that corresponds to such public key; such private key is illustrated as LS PRIV key 184 stored in system 180. License generator 182 may use that private key to decrypt ECEK 124 in order to generate CEK 114. Once generated, the license generator may store the CEK 114 as part of response 190. In some embodiments, CEK 114 may be stored as part of content license 192. In various embodiments, license generator 182 may encrypt response 190 before providing to the content recipient system 140. For instance, in one embodiment, license generator 182 may encrypt LS response 190 with a public key that corresponds to a private key held by system 140 (e.g., so that only system 140 may decrypt the response).

Content consumption component may be configured to process LS response 190 by decrypting the response, extracting CEK 114, utilizing CEK 114 to decrypt encrypted content 122 of packaged content 120 to generate a copy of content 110, extracting content license 192 from the response, and consuming content 110 in accordance with content license 192 extracted from the content license. In various embodiments, consuming content 110 in accordance with content license 192 may include enforcing usage rights specified by that license on the consumption of content 110. In various embodiments, consuming content 110 may include outputting the content to one or more external devices (e.g., displays, transducers/speakers, etc.) through an input/output component (e.g., input/output component 950 of FIG. 13).

In some embodiments, license generator 182 may be configured to check for policy updates, and incorporate such updates (if present) into content license 192. For instance, in various embodiments, system 180 may receive one or more policy updates, which may be provided by packaging systems or other entities. For instance, policy updates may be sent directly from one or more packaging systems or through an intermediary such as a policy update server that receives policy updates from packaging systems and distributes the updates to the appropriate license servers. Irrespective of how system 180 receives such policy updates, policy updater 186 may manage the policy updates by storing them in a policy update data store 188. In various embodiments, data store 188 may be configured as a database, as one or more mass storage devices (e.g., physical disks, logical volumes, etc.) configured to store data blocks or files, or in any other suitable configuration for data storage. At license generation time, license generator 182 may be configured to query policy updater 186 for any available updates to policy 112. If updates to that policy are present within policy update data store 188, the policy updater may respond to such query by providing the updates to the license generator. License generator 182 may generate the license that is part of response 190 such that the license indicates any updated usage rights or polices as indicated by the policy updater.

In various embodiments, due to the inclusion of both the CEK (in encrypted form) and the policy within the packaged content, license servers may access those items from content recipient requests instead of one or more centralized key/policy servers. In this way, multiple license servers configured similar to system 180 may be distributed across a given geographic area without experiencing the implications of utilizing centralized key or policy stores when generating content licenses and provisioning content keys (e.g., network latencies, bottlenecks, single points of failure, or other implications). (In embodiments including multiple license servers, such license servers may share the same private key 184 such that any license server of the group may service requests from any content recipient.) As described above, some embodiments do allow techniques for updating policies and including such updates into licenses generated by the license server. In embodiments that utilize a policy updater, the frequency of policy updates may be low relative to the frequency of requests sent to centralized policy/key stores in conventional systems.

Symmetric Key Approach to Protecting the CEK

In order to maintain the security integrity of the content encryption key in the embodiments of the public key approach described above, the level of security afforded by the public key algorithm of the public key approach (e.g., level of security measured in bits) may be equal to or greater than the security level of the CEK. For instance, if the CEK is a 128 bit key (e.g., a 128 bit key utilized in AES-CBC encryption), the public key security algorithm for the license server may be selected such that the license server's public key provides at least 128 bit security. For instance, in an example where the CEK is a 128 bit key according to AES-CBC encryption, RSA 3072 may be used for the license server's public key because RSA 3072 provides a level of security equal to at least 128 bits. If, for example, RSA 2048 were utilized for the license server's public key, the equivalent level of security would be 112 bit. Since the CEK (128 bit security in this example) may be encrypted with the license server's public key (112 bit security in this example) in the packaged content, the overall effective security protecting the CEK would be decreased from 128 bit security to 112 bit security in this example. In some cases, such diminished security levels may be acceptable (e.g., in cases where speed is of higher concern than security). In cases where such diminished security is not deemed acceptable, a higher level of security may be used for the license server's public key. For instance, instead of RSA 2048 in the example above, RSA 3072 may be utilized to provide an equivalent level of protection of 128, thus matching the security level of the CEK in the example above. While these types of techniques may be utilized in some embodiments, the embodiments described below utilize a symmetric key approach to protecting the CEK. By utilizing symmetric key encryption to provide a sufficient level of security without the resource or computational requirements of public key cryptography, these embodiments may improve the speed at which the overall system operates without sacrificing security. In some embodiments, the symmetric key approach described herein may be less computationally intensive than the public key approach, which may in some cases prove beneficial for operating on less powerful devices, such as mobile phones or other portable devices.

Figure 6:
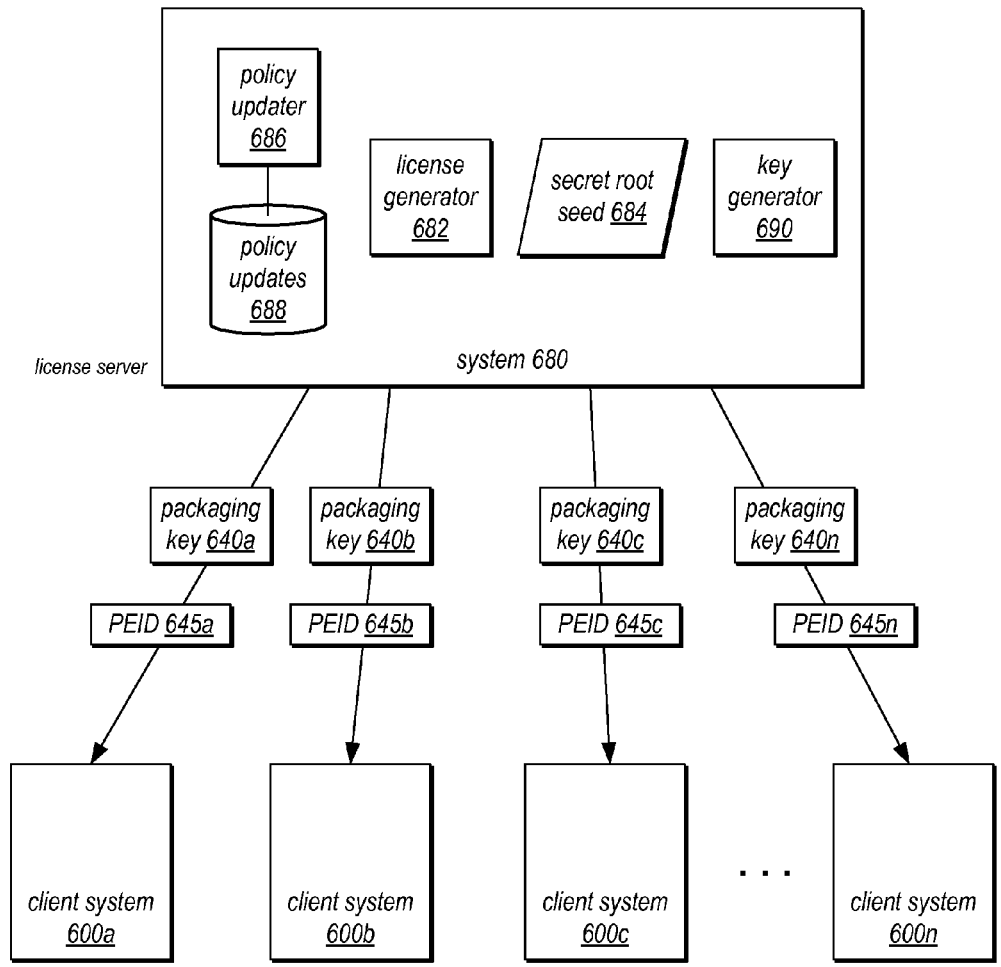
FIG. 6 illustrates a block diagram of a license server provisioning packaging keys, according to some embodiments.

To implement the above-mentioned symmetric key approach, various embodiments may include a key exchange process between the license server and one or more client systems (each of which may serve as a content packager, content recipient, or both). FIG. 6 illustrates one example of such a key exchange between system 680 (e.g., a license server) and one or more client systems 600a-n (collectively referred to as client systems 600). In the illustrated embodiment, system 680 may include a license generator 682, a policy updater 686, a policy updates data store 688, a secret root seed 684, and a key generator 690, each of which are described in more detail herein.

In various embodiments, key generator 690 may be configured to assign an identifier (e.g., a unique identifier) to each of client systems 600. Such an identifier may be referred to herein as a packaging entity identifier (PEID). As illustrated by PEIDs 645a-645n (collectively referred to as PEIDs 645), each PEID assigned by the key generator may be sent to the corresponding client system. In addition to assigning each client system a PEID, the key generator may generate a symmetric encryption key for each client based on that client's PEID. Such keys are illustrated as packaging keys 640a-640n (collectively referred to as packaging keys 640), each of which are transmitted to a respective one of client systems 600. In various embodiment, a given client system's packaging key may be generated from both the PEID of that client system and a secret root seed 684. In various embodiments, secret root seed 684 may be known only to system 680 (e.g., the license server). In some cases, the secret root seed may also be known by one or more other trusted systems (e.g., a group of trusted license servers). One non-limiting example of a secret root seed includes a 128 bit secret, although other bit lengths may be utilized in various embodiments. In some embodiments, the key generator may generate secret root seed 684. In some cases, the secret root seed may be randomly or pseudo-randomly generated according to various seed generation processes.

As described above, a given client system's packaging key may be generated from both the PEID of that client system and a secret root seed 684. In some embodiments, to generate a given client system's packaging key, the key generator may perform a cryptographic hash function over both the secret root seed and that client system's PEID; the result of such hash function may be that client system's packaging key. In one non-limiting example, the key generator may perform an HMAC-SHA1 on the concatenation of the secret root seed and the client system's PEID. Note that in various embodiments, the same secret root seed 684 is used to generate multiple packaging keys 640. In contrast, different ones of PEIDs 645a-n may be utilized to generate respective ones of packaging keys 640 for client systems 600.

Note that in some embodiments, the key provisioning process of FIG. 6 may in various embodiments be performed "out-of-band" in a manner similar to that described above with respect to system 100's out-of-band acquisition of license server public key 116 (e.g., key obtained from a physical medium, from a temporary or one-time network connection, etc.). Also note that the packaging keys sent to the client system need not be stored on the license server system, according to various embodiments. As described in more detail below with respect to license requests, the license server may instead generate such keys when needed. In various embodiments, since the license server system 680 stores the common root seed, the license server system may be configured to dynamically generate any client system's packaging key (e.g., by generating such key "on-the-fly") if given that client system's PEID. Also note that each client system may utilize various measures to protect its respective packaging key, such as storing the packaging key in encrypted form when not in use (or any other method of concealing the packaging key). In some embodiments, a given packaging key is stored securely on a single client system. In some cases, the only other system(s) having access to such key are one or more trusted license servers that include logic for generating such key (given the appropriate PEID). In some embodiments, by utilizing distinct packaging keys for each client, a given client may only be able to "see" (e.g., decrypt) data encrypted with its own packaging key (e.g., a give client system cannot see data encrypted with a packaging key of another client system, in various embodiments).

Figure 7:
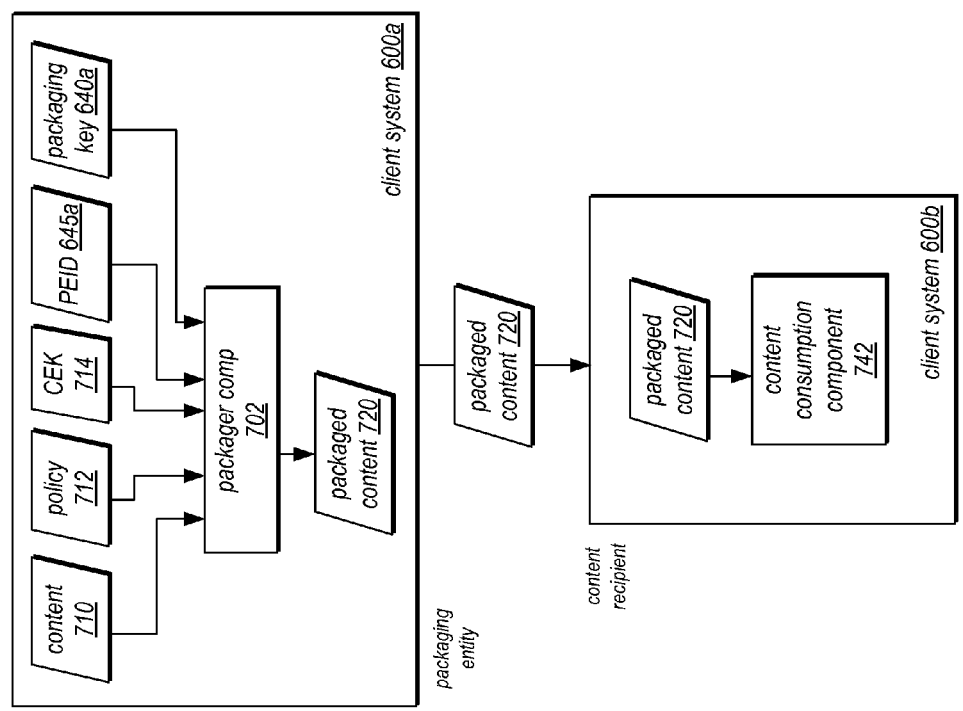
FIG. 7 illustrates a block diagram of a packaging entity creating and distributing packaged content to a content recipient, according to some embodiments.

FIG. 7 illustrates the packaging of content according to some embodiments. In the illustrated embodiment, content 710, policy 712 and CEK 714 may be similar to (or the same as) content 110, policy 112, and CEK 114, respectively (as described above with respect to FIGS. 1-5). Instead of a public key of a license server as described above with respect to the public-key approach of protecting the CEK (FIG. 1), client system 600a may include a packaging entity identifier, such as PEID 645a, and a packaging key, such as packaging key 640a. In various embodiments, such PEID and packaging key may be obtained by the client system prior to packaging time, such as described above with respect to FIG. 6. Additionally, in various embodiments, the same PEID and packaging key may be utilized to package multiple portions of content.

Figure 8:
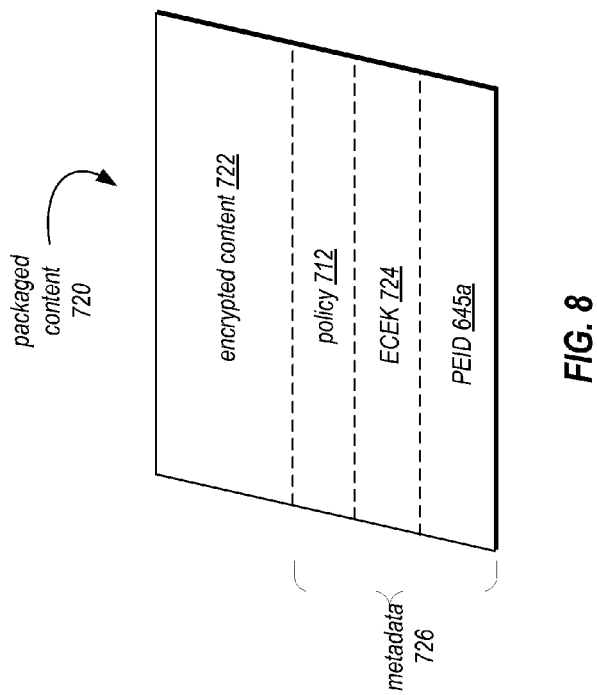
FIG. 8 illustrates an example data structure for packaged content created by a packaging entity, according to some embodiments.

Packaging component 702 may create packaged content 720 from the aforesaid elements stored on the client system. FIG. 8 illustrates one example of packaged content 720 that may be generated by the packager component. FIG. 8 is described collectively with FIG. 7. As illustrated, packager component 702 may generate packaged content 720 such that the packaged content includes encrypted content 722, policy 712, ECEK 724 and PEID 645a. In various embodiments, policy 712 (similar to policy 112 described above with respect to FIG. 1) may indicate one or more usage rights for the content. As described in more detail below, PEID 645a may be included within the content such that the license server, upon receiving such information from a content recipient, will be able to compute or generate packaging key 640a. Encrypted content 722 may in various embodiments be an encrypted version of content 710 that is generated by encrypting content 710 with CEK 714. In one particular non-limiting example, to generate encrypted content 722, packager component 702 may be configured to utilize CEK 714 as a symmetric encryption key in a symmetric encryption process performed on content 710 according to AES-CBC. In various embodiments, ECEK 724 may be an encrypted version of CEK 714. Packager 702 may be configured to generate ECEK 724 by utilizing packaging key 640a as a symmetric encryption key in a symmetric encryption process performed on CEK 714. Note that ECEK 724 is protected in a different manner (symmetric encryption) than ECEK 124 of FIG. 1 (asymmetric encryption).

In various embodiments, packaged content 720 may be provided to a content recipient, such as client system 600b, in manner similar to that described above with respect to content 120 of FIG. 1. For instance, packaged content 720 may be provided to client system 600b either directly or through one or more intermediary systems, such as a CDN or email server. In various embodiments, content consumption component 742, which may be configured similar to content consumption component 142 or FIGS. 1-2, may request a content license and CEK for the packaged content, as described in more detail below with respect to FIG. 9.

Figure 9:
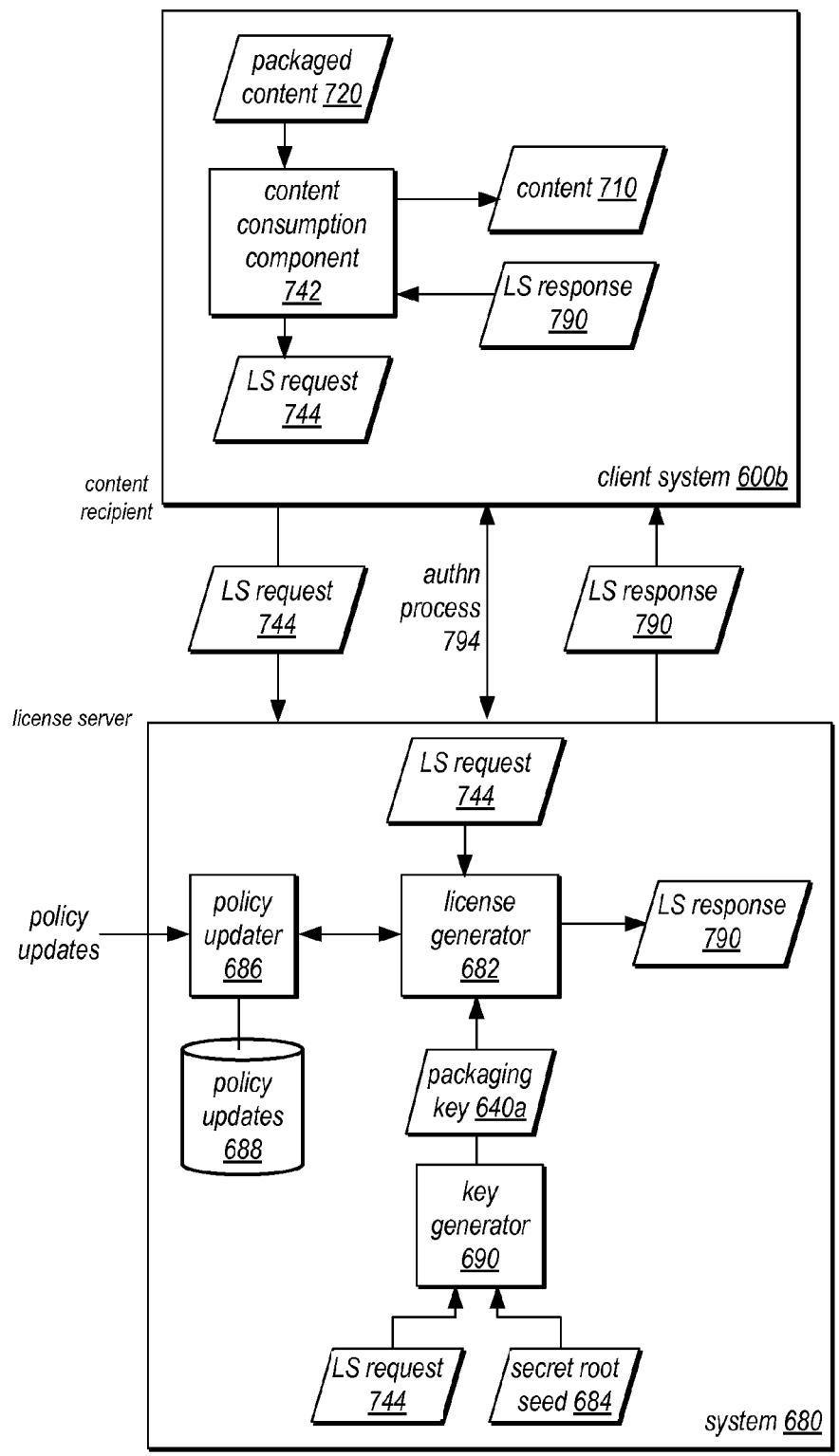
FIG. 9 illustrates a block diagram of a recipient entity requesting and receiving a content license and content encryption key from a license server, according to some embodiments.
Figure 10:
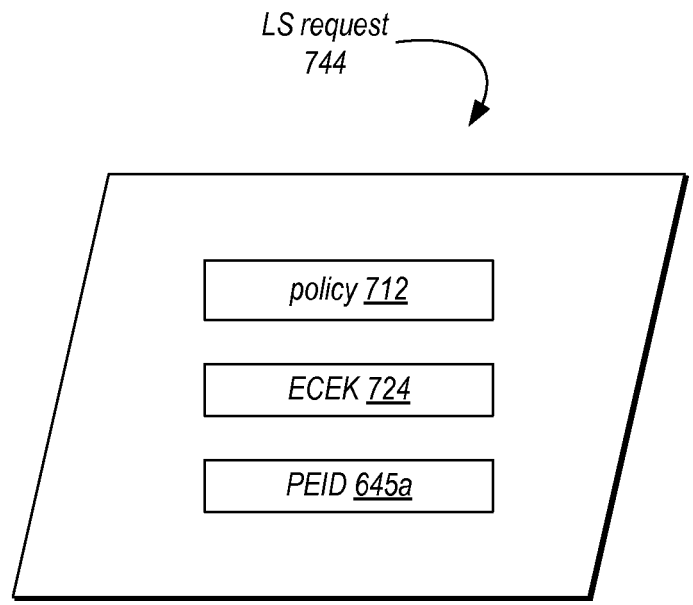
FIG. 10 illustrates an example data structure for a request submitted to a license server, according to some embodiments.

FIG. 9 illustrates a key and license acquisition process between the content recipient system and the license server system, according to some embodiments. Based on packaged content 720, content consumption component may be configured to generate a request for the license server; illustrated as LS request 744. One example of such a request is illustrated in FIG. 10, which is described collectively with FIG. 9. As illustrated in FIG. 10, request 744 generated by the content consumption component may include policy 712, which may be sourced from packaged content 720 by the content consumption component. Request 744 may also include ECEK 724, which may also be sourced from packaged content 720 by the content consumption component. Request 744 may also include PEID 645a sourced from packaged content 720. In various embodiments, each of policy 712, ECEK 724 and PEID 645a may be retrieved by the content consumption component from metadata 726 of the packaged content. The content consumption component may send such information as a request to the license server system 680 in order to request a content license and the CEK for packaged content 720. In various embodiments, one or more portions of request 744 may be digitally signed by client system 600b such that subsequent entities (e.g., the license server) may verify the digital signature to verify the authenticity of the information in the request and/or verify that the request originated from the content recipient (e.g., client system 600b).

License generator 682 of system 680 may be configured to process request 744, as described in more detail below. In various embodiments, license generator 682 may be configured to perform an authentication process 794 with the content recipient's system 600b in order to establish the content recipient's identity. In various embodiments, the content recipient may be identified by a machine/system identifier, an application identifier, or a user identifier. Based on the content recipient's identity, license generator 682 may be configured to determine whether the content recipient is authorized to access the content. In some embodiments, policy 712 of request 744 may indicate one or more authorized users that are authorized to access the content. License generator 682 may be configured to determine whether policy 712 indicates that the content recipient is authorized to access the content. If the content recipient is not authorized to access the content, license generator 682 may be configured to prevent the content recipient from receiving a content license and/or CEK for packaged content 720. If the content recipient is authorized to access the content, the license generator may be configured to generate a response to be sent to system 600b, such response illustrated as LS response 790.

Figure 11:
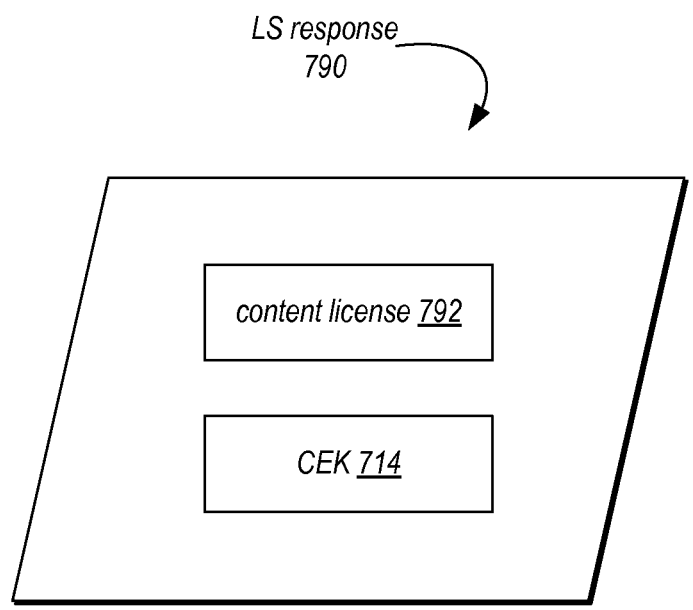
FIG. 11 illustrates an example data structure of a license server's response to a license/key request, according to some embodiments.

FIG. 11 illustrates one example of LS response 790 according to some embodiments; FIG. 11 is described collectively with FIGS. 6-10. As illustrated, the license generator may generate a content license 792 and include such license in the response to the content recipient (e.g., LS response 790). Content license 792 may be generated based on policy 712. In various embodiments, policy 712 may be digitally signed (by the packaging entity); the license generator may be configured to verify the digital signature before using policy 712 for content license generation (e.g., to ensure that the policy has not been tampered with). In various embodiments, content license 792 may be generated such that the content license indicates usage rights extracted from the policy. In some embodiments, the usage rights may be changed or updated based on one or more policy updates as described in more detail below.

In addition to content license 792, license generator 682 may also include a copy of CEK 714 in the response to the content recipient. In various embodiments, license generator 682 may generate CEK 114 as follows. In various embodiments, key generator 690 may access secret root seed 684 stored on system 680 (described above with respect to FIG. 6). Key generator may also access PEID 645a from LS request 744. As described above, key generator may generate packaging key 640a from PEID 645a and secret root seed 684. In various embodiments, key generator 690 may utilize any of the techniques described above with respect to FIG. 6 to generate packaging key 640a. For instance, in one non-limiting example, the key generator may perform an HMAC-SHA1 on the concatenation of secret root seed 684 and PEID 645a; packaging key 640a may be the result of such operation in some embodiments. In various embodiments, license generator 682 may be configured to extract ECEK 724 from LS request 744 and utilize the generated packaging key 640a to decrypt ECEK 724. The result of such decryption may be CEK 714, which may be stored as part of LS response 790. For instance, license generator 682 may utilize the generated packaging key 640a as a symmetric decryption key in a symmetric decryption process performed on ECEK 724; such symmetric decryption process may result in CEK 714.

In various embodiments, license generator 682 may encrypt response 790 before providing it to the content recipient system 600b. For instance, in one embodiment, license generator 682 may encrypt LS response 790 with a public key that corresponds to a private key held by system 600b (e.g., so that only system 600b may decrypt the response).

In other cases, client system 600b may provide system 680 with its PEID (e.g., PEID 645b, described above in regard to FIG. 6), key generator 690 may generate the corresponding packaging key 640b based on that PEID and secret root seed 684 (e.g., via HMAC-SHA1 of PEID and the secret root seed), and license generator 682 may encrypt LS response 790 with packaging key 640b before providing it to client system 600b (such that content consumption component may decrypt the response by using packaging key 640b, which may be stored in client system 600b). In various embodiments (such as embodiments where response 790 is encrypted with the content recipient's packaging key, as described above), authentication process 794 may be optional or omitted altogether. For instance, authentication process 794 may be omitted in various embodiments because only a system that holds the correct packaging key (e.g., packaging key 640b) will be able to decrypt a message that was encrypted with such packaging key. Also note that in various embodiments LS response may not include a content license 792. For instance, in some embodiments, if a license is to be provisioned, it may be sent in a different message separate from CEK 714.

Content consumption component may be configured to process LS response 790 by decrypting the response (e.g., decrypt with a private key or packaging key 640b depending on the manner in which the response is encrypted), extracting CEK 714, utilizing CEK 714 to decrypt encrypted content 722 of packaged content 720 to generate a copy of content 710, extracting content license 792 from the response, and consuming content 710 in accordance with content license 792. In various embodiments, consuming content 710 in accordance with content license 792 may include enforcing usage rights specified by that license on the consumption of content 710. In various embodiments, content 710 may be output to one or more external devices (e.g., display, transducers/speakers, etc.) through an input/output component, such as that of FIG. 13.

Similar to the policy update techniques described above, license generator 682 may be configured to check for policy updates, and incorporate such updates (if present) into content license 792. For instance, in various embodiments, system 680 may receive one or more policy updates, which may be provided by packaging systems. For instance, policy updates may be sent directly from one or more packaging systems or through an intermediary such as a policy updated server that receives policy updates from packaging systems and distributes the updates to the appropriate license servers. Irrespective of how system 680 receives such policy updates, policy updater 686 may manage the policy updates by storing them in a policy update data store 688. In various embodiments, data store 688 may be configured in a manner similar to that of data store 188 described above with respect to FIG. 3. At license generation time, license generator 682 may be configured to query policy updater 686 for any available updates to policy 712. If updates to that policy are present within policy update data store 688, the policy updater may respond to such query by providing the updates to the license generator. License generator 682 may generate the license that goes into response 790 such that the license indicates any updated usage rights as indicated by the updated policy.

Similar to that described above with respect to FIGS. 1-5, due to the inclusion of both the CEK (in encrypted form) and the policy within the packaged content, license servers may access those items from content recipient requests instead of one or more centralized key/policy servers. In this way, multiple license servers configured similar to system 680 may be distributed across a given geographic area without experiencing the implications of utilizing centralized key or policy stores when generating content licenses and provisioning content keys (e.g., network latencies, bottlenecks, single points of failure, etc.). (In embodiments including multiple license servers, such license servers may in some cases share the same secret root seed 684 such that any license server of the trusted group may service requests from any content recipient.) As described above, some embodiments do allow techniques for updating policies and including such updates into licenses generated by the license server. In embodiments that utilize a policy updater, the frequency of policy updates may be low relative to the frequency of requests sent to centralized policy/key stores in conventional systems.

Example Methods

Figure 12:
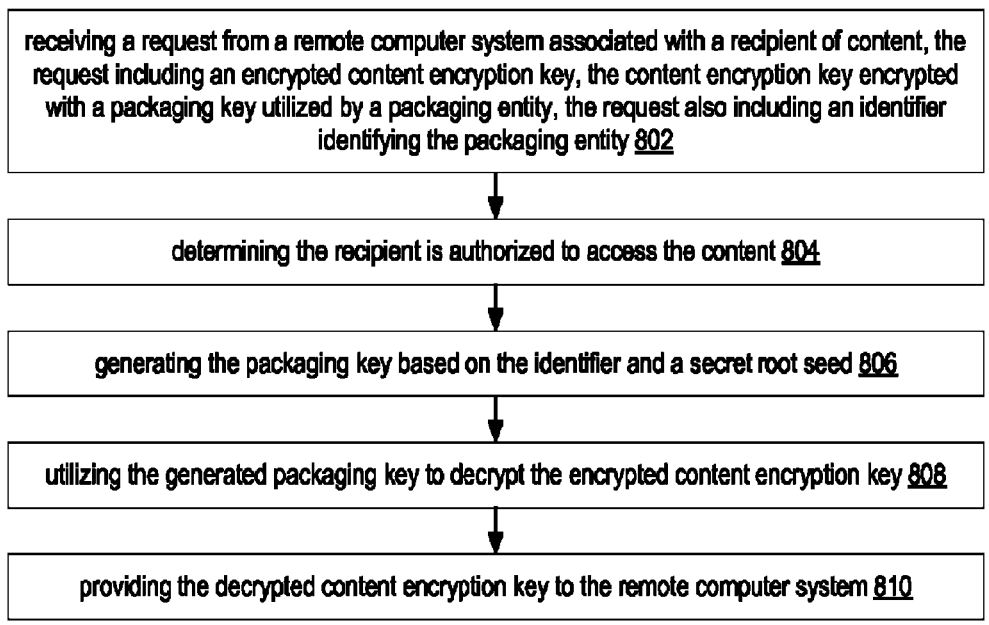
FIG. 12 illustrates a flowchart of an example method for processing key requests, according to some embodiments.

The system and method for decentralized management of keys and policies may include various methods, an example of which is described below with respect to FIG. 12. FIG. 12 illustrates a flowchart of an example method for processing a key request in various embodiments (e.g., LS request 744). In various embodiments, the illustrated method may be performed by system 680 in various embodiments. As illustrated by block 802, the method may include receiving a request (e.g., LS request 744) from a remote computer system (e.g., client system 600*b*) associated with a recipient of content (e.g., the content recipient of FIG. 9). Such request may include an encrypted content encryption key (e.g., ECEK 724). In various embodiments, the content encryption key may have been encrypted with a packaging key (e.g., packaging key 640*a*) utilized by a packaging entity, such as described above with respect to FIG. 7. In various embodiments, the request may also include an identifier identifying the packaging entity (e.g., PEID 645*a*). In some embodiments, the received request may also include policy information, such as policy 712 described above.

As illustrated by block 804, the method may also include determining the recipient is authorized to access the content. For instance, the method may include comparing an identifier of the recipient to a list of identifiers of authorized users within a policy for the content (such as the policies described above). The method may also include performing one or more portions of authentication process 794 described above. In various embodiments, the portions of the method associated with blocks 806, 808, 810 may be performed in response to determining that the recipient is authorized to access the content.

As illustrated by block 806, the method may also include generating the packaging key based on the identifier and a secret root seed. For instance, in various embodiments, the method may include utilizing any of the techniques described above with respect to key generator 690 in order to generate a packaging key (e.g., packaging key 640*a*) from an identifier of the request (e.g., PEID 645*a*) and a secret root see (e.g., secret root seed 684).

As illustrated by block 808, the method may include utilizing the generated packaging key to decrypt the encrypted content encryption key. For instance, in various embodiments, the method may include utilizing any of the techniques described above with respect to license generator 682 decrypting ECEK 724 in order to generate CEK 714.

As illustrated by block 810, the method may also include providing the decrypted content encryption key to the remote computer system 810. In various embodiments, this may include utilizing any of the techniques described above with respect to system 680 providing LS response 790, which includes CEK 714, to client system 600*b*. In various embodiments, the method may also include providing a content license in addition to the decrypted content encryption key to the remote computer system. For instance, as described above, response 790 may include both a content license and a decryption content encryption key.

Electronic Mail

In various embodiments, the techniques and systems described herein may be utilized for digital rights management of email messages. In such embodiments, the content described above (e.g., content 110, content 710) may be email messages including but not limited to email content and associated email metadata (e.g., email header information). In such embodiments, any given computer system (or other electronic device) may operate as a content packager, a content recipient, or both. For instance, email clients (e.g., an application configured to received, send, and/or manage email) may be configured with a packager component, such as packager components 102 or 702 described above. When an email is sent from such a system, the email client may call the packager component to package the email in accordance with the techniques described herein. The email client may then send the packaged email to the recipient, either directly or through one or more intermediary systems (e.g., email servers). In addition to content packaging capabilities, an email client of a given client system may also include a content consumption component (e.g., content consumption component 142 or content consumption component 742) configured to request and receive both a content license and a CEK for a received email, such as the packaged email described above. Upon receiving the content license and CEK, the email client may decrypt the email with the CEK and consume the email (e.g., present, render, and/or display the email) in accordance with usage rights specified by the content license.

Example Computer System

Various embodiments of a system and method for decentralized management of keys and policies, as described herein, may be executed on one or more computer systems, which may interact with various other devices. One such computer system is computer system 900 illustrated by FIG. 12, which may in various embodiments implement any of the elements or functionality illustrated in FIGS. 1-12. In various embodiments, computer system 900 may be configured to implement server system 680 described above. While the illustrated system demonstrates computer system 900 implementing the elements of server system 680, computer system 900 may be used to implement any other system, functionality or method of the above-described embodiments. In the illustrated embodiments, computer system 900 may be configured to implement policy updater 686, license generator 682, and/or key generator 690, each of which may be stored in memory as processor-executable executable program instructions 922 (e.g., program instructions executable by processor(s) 910) in various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, data 932 may include secret root seed 684 and a data store of policy updates 688. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the DRM framework described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more client system(s) 600, or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the methods described above, such as the method illustrated by the flowchart of FIG. 12. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the embodiments described herein may be practiced with other computer system configurations.

Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
   receiving, by a licensing system, an encrypted content encryption key from a remote computer system and a packaging entity identifier, wherein the packaging entity identifier identifies a packaging entity providing encrypted content to a content recipient associated with the remote computer system, wherein the encrypted content encryption key is encrypted by the packaging entity using a packaging key;
   generating, by the licensing system, the packaging key based on the packaging entity identifier and a secret root seed, wherein the secret root seed is inaccessible to the remote computer system and the packaging entity;
   decrypting, by the licensing system, the encrypted content encryption key with the generated packaging key to generate a decrypted content encryption key; and
   providing, by the licensing system, the decrypted content encryption key to the remote computer system for decrypting the encrypted content.

2. The method of claim 1, further comprising:
   accessing a policy provided by the packaging entity and included in a request received from the remote computer system to decrypt the encrypted content encryption key, wherein the policy is signed by the packaging entity with a digital signature;
   verifying, based on the digital signature, an absence of tampering with the policy as provided by the packaging entity; and
   determining that the content recipient is authorized to access the encrypted content using the policy.

3. The method of claim 1, further comprising:
   receiving a policy from the remote computer system specifying at least one usage right;
   generating a content license restricting use of the encrypted content based on the at least one usage right, wherein the at least one usage right comprises at least one of restricting use of the encrypted content to a specified time period and restricting actions that can be performed with respect to the encrypted content; and
   providing the content license to the remote computer system.

4. The method of claim 1, further comprising:
   receiving a policy from the remote computer system specifying at least one first usage right;
   obtaining a policy update from the packaging entity, wherein the policy update replaces the at least one first usage right with at least one second usage right;
   modifying the policy using the policy update to reflect the at least one second usage right;
   generating a content license restricting use of the encrypted content based on the at least one second usage right specified by the policy as modified; and
   providing the content license to the remote computer system.

5. The method of claim 1, wherein providing the encrypted content encryption key to the remote computer system comprises:
   encrypting a message including the encrypted content encryption key as decrypted by the packaging key, the message encrypted with an encryption key that corresponds to a decryption key accessible to the remote computer system; and
   providing the encrypted message to the remote computer system.

6. The method of claim 1, wherein the method further comprises authenticating the content recipient.

7. The method of claim 1, further comprising:
   assigning, by the licensing system, the packaging entity identifier to the packaging entity;
   generating, by the licensing system, the packaging key based on the secret root seed and the packaging entity identifier, wherein the secret root seed is unknown to the packaging entity; and
   providing, by the licensing system, the packaging entity identifier and the packaging key to the packaging entity.

8. The method of claim 7, further comprising:
   assigning, by the licensing system, an additional packaging entity identifier that is different from the packaging entity identifier to an additional packaging entity different from the packaging entity;
   generating, by the licensing system, an additional packaging key that is different from the packaging key based on the secret root seed and the additional packaging entity identifier;
   providing, by the licensing system, the additional packaging entity identifier and the additional packaging key to the additional packaging entity.

9. The method of claim 7, wherein the packaging entity identifier and the packaging key are provided to the packaging entity prior to receiving a request from the remote computer system to decrypt the encrypted content encryption key.

10. The method of claim 7, wherein the packaging entity identifier and the packaging key are provided to the packaging entity via secure communication using a one-time network connection.

11. The method of claim 7, further comprising deleting, by the licensing system, the packaging key from a memory of the licensing system after providing the packaging entity identifier and the packaging key to the packaging entity, wherein the packaging key is regenerated by the licensing system after receiving a request from the remote computer system to decrypt the encrypted content encryption key.

12. A licensing system comprising:
   a memory; and
   at least one processor coupled to the memory, wherein the at least one processor is configured to execute program instructions stored in the memory, wherein the program instructions are configured for:

receiving an encrypted content encryption key from a remote computer system and a packaging entity identifier, wherein the packaging entity identifier identifies a packaging entity providing encrypted content to a content recipient associated with the remote computer system, wherein the encrypted content encryption key is encrypted by the packaging entity using a packaging key, generating the packaging key based on the packaging entity identifier and a secret root seed, wherein the secret root seed is inaccessible to the remote computer system and the packaging entity, decrypting the encrypted content encryption key with the generated packaging key to generate a decrypted content encryption key, and providing the decrypted content encryption key to the remote computer system for decrypting the encrypted content.

13. The licensing system of claim 12, wherein the decrypted content encryption key is a symmetric key for decrypting the encrypted content.

14. The licensing system of claim 12, wherein the program instructions are further configured for:

accessing a policy provided by the packaging entity and included in a request received from the remote computer system to decrypt the encrypted content encryption key, wherein the policy is signed by the packaging entity with a digital signature;

verifying, based on the digital signature, an absence of tampering with the policy as provided by the packaging entity; and determining that the content recipient is authorized to access the encrypted content using the policy.

15. The licensing system of claim 12, wherein the program instructions are further configured for:

receiving a policy from the remote computer system specifying at least one usage right;

generating a content license restricting use of the encrypted content based on the at least one usage right, wherein the at least one usage right comprises at least one of restricting use of the encrypted content to a specified time period and restricting actions that can be performed with respect to the encrypted content; and providing the content license to the remote computer system.

16. The licensing system of claim 12, wherein the program instructions are further configured for:

receiving a policy from the remote computer system specifying at least one first usage right;

obtaining a policy update from the packaging entity, wherein the policy update replaces the at least one first usage right with at least one second usage right;

modifying the policy using the policy update to reflect the at least one second usage right;

generating a content license restricting use of the encrypted content based on the at least one second usage right specified by the policy as modified; and providing the content license to the remote computer system.

17. The licensing system of claim 12, wherein generating the packaging key comprises performing a cryptographic hash function on the packaging entity identifier and the secret root seed to generate a result, wherein the generated packaging key is the result of the cryptographic hash function.

18. The licensing system of claim 12, wherein utilizing the generated packaging key to decrypt the encrypted content encryption key comprises utilizing the generated packaging key as a symmetric key to decrypt the encrypted content encryption key according to a symmetric decryption process.

19. The licensing system of claim 12, wherein providing the encrypted content encryption key to the remote computer system comprises:

encrypting a message including the encrypted content encryption key as decrypted by the packaging key, the message encrypted with an encryption key that corresponds to a decryption key accessible to the remote computer system; and providing the encrypted message to the remote computer system.

20. The licensing system of claim 12, wherein the encrypted content is an encrypted electronic mail message.

21. The licensing system of claim 12, wherein the program instructions are further configured for authenticating the content recipient.

22. The licensing system of claim 12, wherein the program instructions are further configured for:

assigning the packaging entity identifier to the packaging entity;

generating, by the licensing system, the packaging key based on the secret root seed and the packaging entity identifier, wherein the secret root seed is unknown to the packaging entity; and providing, by the licensing system, the packaging entity identifier and the packaging key to the packaging entity.

23. The licensing system of claim 22, wherein the program instructions are further configured for:

assigning an additional packaging entity identifier that is different from the packaging entity identifier to an additional packaging entity different from the packaging entity;

generating, by the licensing system, an additional packaging key that is different from the packaging key based on the secret root seed and the additional packaging entity identifier;

providing, by the licensing system, the additional packaging entity identifier and the additional packaging key to the additional packaging entity.

24. The licensing system of claim 22, wherein the packaging entity identifier and the packaging key are provided to the packaging entity prior to receiving a request from the remote computer system to decrypt the encrypted content encryption key.

25. The licensing system of claim 22, wherein the packaging entity identifier and the packaging key are provided to the packaging entity via secure communication using a one-time network connection.

26. The licensing system of claim 22, wherein the program instructions are further configured for deleting the packaging key from the memory of the licensing system after providing the packaging entity identifier and the packaging key to the packaging entity, wherein the packaging key is regenerated by the licensing system after receiving a request from the remote computer system to decrypt the encrypted content encryption key.

27. The licensing system of claim 22, wherein the licensing system comprises a trusted group of licensing servers, wherein the secret root seed is accessible to each licensing server of the trusted group of licensing servers, wherein the trusted group includes a licensing server having the memory and the at least one processor in a first geographic area and an additional licensing server having an additional memory and at least one additional processor in a second geographic area, wherein the at least one additional processor is configured to execute program instructions stored in the additional memory, wherein the program instructions are further configured for:
receiving the encrypted content encryption key,
generating the packaging key based on the packaging entity identifier and the secret root seed accessible to the licensing server and the additional licensing server;
decrypting the encrypted content encryption key with the generated packaging key to generate the decrypted content encryption key; and
providing the decrypted content encryption key to the remote computer system for decrypting the encrypted content.

28. A non-transitory computer-readable medium storing program instructions computer-executable on a computer system, the program instructions comprising:
program instructions for receiving an encrypted content encryption key from a remote computer system and a packaging entity identifier, wherein the packaging entity identifier identifies a packaging entity providing encrypted content to a content recipient associated with the remote computer system, wherein the encrypted content encryption key is encrypted by the packaging entity using a packaging key;
program instructions for receiving generating the packaging key based on the packaging entity identifier and a secret root seed, wherein the secret root seed is inaccessible to the remote computer system and the packaging entity;
program instructions for receiving decrypting the encrypted content encryption key with the generated packaging key to generate a decrypted content encryption key; and
program instructions for receiving providing the decrypted content encryption key to the remote computer system for decrypting the encrypted content.

29. The non-transitory computer-readable medium of claim 28, wherein the decrypted content encryption key is a symmetric key for decrypting the encrypted content.

30. The non-transitory computer-readable medium of claim 28, further comprising:
program instructions accessing a policy provided by the packaging entity and included in a request received from the remote computer system to decrypt the encrypted content encryption key, wherein the policy is signed by the packaging entity with a digital signature;
program instructions for verifying, based on the digital signature, an absence of tampering with the policy as provided by the packaging entity; and
program instructions for determining that the content recipient is authorized to access the encrypted content using the policy.

31. The non-transitory computer-readable medium of claim 28, further comprising:
program instructions for receiving a policy from the remote computer system specifying at least one usage right;
program instructions for generating a content license restricting use of the encrypted content based on the at least one usage right, wherein the at least one usage right comprises at least one of restricting use of the encrypted content to a specified time period and restricting actions that can be performed with respect to the encrypted content; and
program instructions for providing the content license to the remote computer system.

32. The non-transitory computer-readable medium of claim 28, further comprising:

program instructions for receiving a policy from the remote computer system specifying at least one first usage right;
program instructions for obtaining a policy update from the packaging entity, wherein the policy update replaces the at least one first usage right with at least one second usage right;
program instructions for modifying the policy using the policy update to reflect the at least one second usage right;
program instructions for generating a content license restricting use of the encrypted content based on the at least one second usage right specified by the policy as modified; and
program instructions for providing the content license to the remote computer system.

33. The non-transitory computer-readable medium of claim 28, wherein generating the packaging key comprises performing a cryptographic hash function on the packaging entity identifier and the secret root seed to generate a result, wherein the generated packaging key is the result of the cryptographic hash function.

34. The non-transitory computer-readable medium of claim 28, wherein utilizing the generated packaging key to decrypt the encrypted content encryption key comprises utilizing the generated packaging key as a symmetric key to decrypt the encrypted content encryption key according to a symmetric decryption process.

35. The non-transitory computer-readable medium of claim 28, wherein providing the encrypted content encryption key to the remote computer system comprises:
encrypting a message including the encrypted content encryption key as decrypted by the packaging key, the message encrypted with an encryption key that corresponds to a decryption key accessible to the remote computer system; and
providing the encrypted message to the remote computer system.

36. The non-transitory computer-readable medium of claim 28, wherein the encrypted content is an encrypted electronic mail message.

37. The non-transitory computer-readable medium of claim 28, further comprising program instructions for authenticating the content recipient.

38. The non-transitory computer-readable medium of claim 28, further comprising:
program instructions for assigning the packaging entity identifier to the packaging entity;
program instructions for generating the packaging key based on the secret root seed and the packaging entity identifier, wherein the secret root seed is unknown to the packaging entity; and
program instructions for providing the packaging entity identifier and the packaging key to the packaging entity.

39. The non-transitory computer-readable medium of claim 28, further comprising:
program instructions for assigning an additional packaging entity identifier that is different from the packaging entity identifier to an additional packaging entity different from the packaging entity;
program instructions for generating an additional packaging key that is different from the packaging key based on the secret root seed and the additional packaging entity identifier;
program instructions for providing the additional packaging entity identifier and the additional packaging key to the additional packaging entity.

40. The non-transitory computer-readable medium of claim 28, wherein the packaging entity identifier and the packaging key are provided to the packaging entity prior to receiving a request from the remote computer system to decrypt the encrypted content encryption key.

41. The non-transitory computer-readable medium of claim 28, wherein the packaging entity identifier and the packaging key are provided to the packaging entity via secure communication using a one-time network connection.

42. The non-transitory computer-readable medium of claim 41, further comprising program instructions for deleting the packaging key from a memory after providing the packaging entity identifier and the packaging key to the packaging entity, wherein the packaging key is regenerated by the licensing server after receiving a request from the remote computer system to decrypt the encrypted content encryption key.

* * * * *